United States Patent
Uttermann et al.

(10) Patent No.: US 9,099,856 B2
(45) Date of Patent: *Aug. 4, 2015

(54) CONNECTOR BRACKET

(71) Applicant: APPLE INC., Cupertino, CA (US)

(72) Inventors: Erik A. Uttermann, San Francisco, CA (US); John Raff, Menlo Park, CA (US); Piotr S. Trzaskos, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,345

(22) Filed: Jun. 27, 2014

(65) Prior Publication Data

US 2015/0008031 A1    Jan. 8, 2015

Related U.S. Application Data

(63) Continuation of application No. 13/833,421, filed on Mar. 15, 2013, now Pat. No. 8,804,355.

(60) Provisional application No. 61/699,818, filed on Sep. 11, 2012.

(51) Int. Cl.
*H05K 5/00* (2006.01)
*H02G 15/007* (2006.01)
(Continued)

(52) U.S. Cl.
CPC ........... *H02G 15/007* (2013.01); *H01R 13/516* (2013.01); *H01R 13/74* (2013.01)

(58) Field of Classification Search
CPC .. H01R 13/516; H01R 13/74; H01R 13/5202; H01R 13/748; H02G 15/007; H02G 3/22; H04M 1/0274; H05K 7/1418; G06F 1/184; G06F 1/185

USPC ............... 361/730, 752, 756, 810; 439/527; 174/650
See application file for complete search history.

(56) References Cited

U.S. PATENT DOCUMENTS

| 5,002,184 | A | 3/1991 | Lloyd |
| 6,052,279 | A | 4/2000 | Friend et al. |

(Continued)

FOREIGN PATENT DOCUMENTS

| CN | 201252244 Y | 6/2009 |
| CN | 102437492 A | 5/2012 |

(Continued)

OTHER PUBLICATIONS

International Search Report and Written Opinion for International PCT Application No. PCT/US2013/056594, mailed Nov. 21, 2013, 10 pages.

(Continued)

*Primary Examiner* — Yuriy Semenenko
(74) *Attorney, Agent, or Firm* — Kilpatrick Townsend & Stockton LLP

(57) ABSTRACT

Brackets may be mated with or coupled to an opening of an electronic device enclosure or housing for receiving plug connectors to reinforce the receptacle connector and/or device housing and potentially reduce damage/breakage. For example, a bracket can have a front face with a curvature. A back face of the bracket can include a first opening that communicates with a cavity. The cavity can be defined at least in part by upper and lower opposing inner surfaces, the lower inner surface including a portion that extends parallel to a portion of the bracket front face. The bracket can also include a hollow protrusion extending from the bracket front face in a front direction. The hollow protrusion can include an opening that communicates with the opening of the back face and extends through the hollow protrusion. Methods for manufacturing the connector bracket are also provided.

18 Claims, 16 Drawing Sheets

(51) Int. Cl.
*H01R 13/516* (2006.01)
*H01R 13/74* (2006.01)

(56) References Cited

U.S. PATENT DOCUMENTS

| | | | |
|---|---|---|---|
| 6,089,910 A | 7/2000 | Suzuki et al. | |
| 6,178,096 B1 | 1/2001 | Flickinger et al. | |
| 6,229,695 B1 | 5/2001 | Moon | |
| 6,244,886 B1 | 6/2001 | Strang et al. | |
| 6,254,428 B1 | 7/2001 | Murakami et al. | |
| 6,361,357 B1 | 3/2002 | Stillwell et al. | |
| 6,388,877 B1 | 5/2002 | Canova et al. | |
| 6,625,013 B2 | 9/2003 | Minaguchi et al. | |
| 6,962,510 B1* | 11/2005 | Chen et al. | 439/660 |
| 7,209,113 B2 | 4/2007 | Park | |
| 7,481,664 B1* | 1/2009 | Knoll et al. | 439/359 |
| 7,652,892 B2 | 1/2010 | Shiu et al. | |
| 7,753,701 B2 | 7/2010 | Tsuji | |
| 7,758,369 B2 | 7/2010 | Miller et al. | |
| 7,933,123 B2 | 4/2011 | Wang et al. | |
| 8,204,561 B2 | 6/2012 | Mongan et al. | |
| 8,342,325 B2 | 1/2013 | Rayner | |
| 8,542,482 B2 | 9/2013 | Hsiung | |
| 8,804,353 B2 | 8/2014 | Montevirgen et al. | |
| 8,804,354 B2 | 8/2014 | Golko et al. | |
| 8,804,355 B2* | 8/2014 | Uttermann et al. | 361/756 |
| 2003/0049964 A1 | 3/2003 | Pogliani | |
| 2004/0240162 A1 | 12/2004 | Hsu et al. | |
| 2004/0248467 A1* | 12/2004 | Herlitz et al. | 439/607 |
| 2005/0032415 A1 | 2/2005 | Sakamoto | |
| 2005/0124218 A1 | 6/2005 | Chen et al. | |
| 2005/0202727 A1 | 9/2005 | Andre et al. | |
| 2007/0206365 A1 | 9/2007 | Shiu et al. | |
| 2008/0050935 A1 | 2/2008 | Tsuji | |
| 2009/0059492 A1 | 3/2009 | Glover | |
| 2009/0080153 A1 | 3/2009 | Richardson et al. | |
| 2009/0130875 A1 | 5/2009 | Guo | |
| 2009/0257189 A1 | 10/2009 | Wang et al. | |
| 2009/0269962 A1 | 10/2009 | Miller et al. | |
| 2010/0178957 A1 | 7/2010 | Chen | |
| 2010/0323554 A1 | 12/2010 | Shiu | |
| 2010/0323562 A1 | 12/2010 | Yash | |
| 2011/0068665 A1* | 3/2011 | Cao | 312/223.1 |
| 2011/0086544 A1 | 4/2011 | Yoshioka et al. | |
| 2012/0008292 A1 | 1/2012 | Nichols et al. | |
| 2012/0051025 A1 | 3/2012 | Jol et al. | |
| 2012/0181317 A1 | 7/2012 | Evens | |
| 2013/0188312 A1 | 7/2013 | Rayner | |
| 2014/0014408 A1 | 1/2014 | Milheiro et al. | |
| 2014/0069712 A1 | 3/2014 | Montevirgen et al. | |
| 2014/0069713 A1 | 3/2014 | Golko et al. | |
| 2014/0069714 A1 | 3/2014 | Uttermann et al. | |
| 2014/0078671 A1 | 3/2014 | Hong | |
| 2014/0192481 A1 | 7/2014 | Wojcik et al. | |
| 2015/0001364 A1 | 1/2015 | Golko et al. | |

FOREIGN PATENT DOCUMENTS

| | | |
|---|---|---|
| GB | 2361114 A | 10/2001 |
| JP | 2007127206 A | 5/2007 |
| TW | 409977 U | 10/2000 |
| TW | M331786 U | 5/2008 |
| TW | M400721 U | 3/2011 |
| TW | M409691 U | 8/2011 |
| TW | M423394 U | 2/2012 |
| WO | 2011160138 A2 | 12/2011 |

OTHER PUBLICATIONS

International Search Report and Written Opinion for International PCT Application No. PCT/US2013/056591, mailed Nov. 21, 2013, 10 pages.
International Search Report and Written Opinion for International PCT Application No. PCT/US2013/056596, mailed Dec. 4, 2013, 14 pages.
Notice of Allowance for U.S. Appl. No. 13/833,061, mailed Apr. 1, 2014, 10 pages.
Notice of Allowance for U.S. Appl. No. 13/833,421, mailed Apr. 3, 2014, 15 pages.
Notice of Allowance for U.S. Appl. No. 13/833,224, mailed Apr. 10, 2014, 15 pages.
Office Action for Taiwanese Application No. 102130312, mailed Sep. 16, 2014, 9 pages.
Office Action for Taiwanese Patent Application No. 102130318, mailed Dec. 12, 2014, 6 pages.
Non-Final Office Action for U.S. Appl. No. 14/318,346, mailed Mar. 11, 2015, 11 pages.
International Preliminary Report on Patentability for International PCT Application No. PCT/US2013/056596, mailed Mar. 26, 2015, 10 pages.

* cited by examiner

CONNECTOR BRACKET

CROSS REFERENCE TO RELATED APPLICATIONS

This application is a continuation of U.S. application Ser. No. 13/833,421 filed Mar. 15, 2013, which claims benefit under 35 U.S.C. §119(e), of U.S. Patent Application No. 61/699,818 filed Sep. 11, 2012 for "Connector Trim". The entire disclosures of the above mentioned applications are incorporated by reference for all purposes.

BACKGROUND OF THE INVENTION

The present invention relates generally to electronic device enclosures or housings, and in particular the interface between electronic device housings and electrical connectors.

Many electronic devices include electrical connectors that receive and provide power and data. For example, devices, such as tablets, laptops, netbooks, desktops, and all-in-one computers; cell, smart, and media phones; storage devices, portable media players, navigation systems, monitors, and others, use electrical connectors for power and/or data. These electrical connectors are typically receptacle connectors and are designed to receive a male plug connector. The plug connector may plug into the receptacle connector through an opening in the housing of an electronic device, thereby forming one or more conductive paths for signals and power. These receptacle connectors may be attached or otherwise fixed to housings that surround an electronic device.

In response to the demand for smaller and lighter electronic devices, device enclosures have increasingly limited internal space while still including a large number of internal components. Limited space within the enclosures of devices creates a number of challenges. For example, the limited internal space of these enclosures drives the demand for smaller internal components such as smaller receptacle connectors for receiving smaller corresponding plug connectors. However, smaller receptacle connectors may be prone to breaking due to thinner receptacle connectors walls, particularly when made from polymers. In addition, lighter electronic devices may include housings that are made from lighter, less robust materials that may also be prone to being damaged and/or breaking Damage to these receptacle connectors and/or device housings may occur during normal use of devices or when plug connectors are improperly inserted into and/or extracted from receptacle connectors and device housings.

Some plug connectors may be made from materials that are stronger than the corresponding receptacle connectors and/or the enclosures in which the receptacle connectors are housed. This may create additional challenges.

BRIEF SUMMARY OF THE INVENTION

Various embodiments of the invention pertain to trim rings or brackets that may be mated with or coupled to an opening of an electronic device enclosure or housing for receiving plug connectors to improve upon some or all of the above described deficiencies. For example, trim rings or brackets may be coupled or mated with a receptacle connector and an opening of a device housing to reinforce the receptacle connector and/or device housing and potentially reduce damage/breakage. These brackets may be made from materials with strong wear characteristics to withstand repeated contact with plug connectors. In addition, the material used to make the brackets may be of a stronger material than the device housing so as to prevent deformation of the device housing when toque or other forces are applied by a plug connector. The structural design of the bracket may also serve to spread loads, moments or torques applied to the bracket by a plug connector over a larger surface area of the device housing rather than at localized points on the device housing or the receptacle connector.

Accordingly, there is provided a bracket, comprising:
a bracket front face having a curvature;
a bracket back face including a first opening that communicates with a cavity, the cavity defined at least in part by:
    upper and lower opposing inner surfaces, the lower inner surface including a portion that extends parallel to a portion of the bracket front face; and
a hollow protrusion extending from the bracket front face in a front direction;
a second opening that communicates with the first opening and extends through the hollow protrusion; and
a bracket upper face and a bracket lower face, which faces oppose each other.

There is also provided a bracket for mating with a receptacle connector and an opening of a housing of an electronic device, the bracket comprising:
a bracket front face;
a bracket back face;
the bracket front face comprising:
    an upper portion including a planar center upper portion and left and right upper portions, the left upper portion having a curvature extending from the center upper portion toward a back direction and a left direction; the right upper portion having a curvature extending from the center upper portion toward the back direction and a right direction;
    a lower portion including a center lower portion and left and right lower portions, the center lower portion having a curvature extending from the planar center upper portion toward the back direction and a lower direction, the right lower portion having a curvature extending from the center lower portion toward the back and right directions, the left lower portion having a curvature extending from the center lower portion toward the back and lower directions;
a hollow protrusion extending in a front direction;
a first elongated opening extending through the hollow protrusion and the bracket, from the front bracket face to the back bracket face, the first elongated opening comprising:
    planar upper and lower first elongated opening inner surfaces that extend parallel to the upper and lower hollow protrusion outer surfaces, respectively;
    right and left arcuate first elongated opening inner surfaces, the right and left arcuate first elongated opening inner surfaces extending between the upper and lower first elongated opening inner surfaces, the right and left first elongated opening arcuate inner surfaces extending in a direction concentric with the right and left arcuate hollow protrusion outer surfaces, respectively;
the bracket back face comprising:
    an irregularly shaped opening that communicates with a cavity, the cavity defined at least in part by:
        upper and lower opposing irregularly shaped opening inner surfaces, the lower irregularly shaped opening inner surface including a portion that extends parallel to the lower center portion of the bracket front face; and left and right opposing irregularly shaped opening inner surfaces; and left and right alignment surfaces including left and right openings, respectively, the left and right openings oriented in a front to back direction; and a second elongated opening, the second elongated opening corresponding to and larger than the first elongated opening, the second elongated opening comprising:

a planar lower second elongated opening inner surface that extends parallel to the lower first elongated opening inner surface;

right and left arcuate second elongated opening inner surfaces extending between the upper irregularly shaped opening inner surface and the lower second elongated opening inner surface, the right and left arcuate second elongated opening inner surfaces extending in a direction concentric with the right and left arcuate hollow protrusion inner surfaces, respectively; and a bracket upper face and a bracket lower face, which faces oppose each other and are oriented in planes that are parallel.

There is also provided a bracket for mating with a receptacle connector and an opening of a housing of an electronic device, the bracket comprising:

a planar bracket upper face and a planar bracket lower face, which faces oppose each other;

first and second fastener openings disposed on left and right portions of the bracket upper face, respectively;

a bracket front face having a curvature extending from the bracket upper face toward a back direction and a lower direction;

a hollow protrusion extending in a front direction;

a first elongated opening extending through the hollow protrusion and the bracket, from the front bracket face to the back bracket face, the first elongated opening comprising:

planar upper and lower first elongated opening inner surfaces that extend parallel to the upper and lower hollow protrusion outer surfaces, respectively;

right and left arcuate first elongated opening inner surfaces, the right and left arcuate first elongated opening inner surfaces extending between the upper and lower first elongated opening inner surfaces, the right and left first elongated opening arcuate inner surfaces extending in a direction concentric with the right and left arcuate hollow protrusion outer surfaces, respectively;

a planar bracket back face comprising:

a second elongated opening communicating with the first elongated opening, the second elongated opening larger than the first elongated opening in a right to left direction and the upper to lower direction thereby forming a first ledge extending between the first and second elongated openings, the first ledge oriented in a plane that is parallel to the bracket back face;

a third elongated opening communicating with the second elongated opening, the third elongated opening larger than the second elongated opening in the right to left direction thereby forming a second ledge extending between the second and third elongated openings, the second ledge oriented in a plane that is parallel to the bracket back face;

a fourth elongated opening communicating with the third elongated openings, the fourth elongated opening larger than the third elongated opening in the right to left and the upper to lower directions thereby forming a third ledge extending between the third and fourth elongated openings, the third ledge oriented in a plane that is parallel to the bracket back face; and a fifth elongated opening communicating with the fourth elongated openings, the fifth elongated opening larger than the fourth elongated opening in the right to left and the upper to lower directions thereby forming a fourth ledge extending between the fourth and fifth elongated openings, the fourth ledge oriented in a plane that is parallel to the bracket back face and including first and second alignment openings on a right and a left portion of the fourth ledge, respectively;

a bracket right face extending from the bracket front face towards the back direction and a right direction; and a bracket left face extending from the bracket front face towards the back direction and a left direction.

Although aspects of the invention are described in relation to environments where space within the enclosure of an electronic device is limited or where lighter, less robust materials are used for device housings and/or receptacle connectors, it is appreciated that these features and aspects can be used in a variety of different environments, regardless of space and weight constraints.

Trim rings or brackets described herein can be used in a variety of different electronic devices, which may use a variety of different connector technologies. These different connector technologies may include standard USB and mini USB connectors, FireWire connectors, as well as many of the proprietary connectors, e.g., Apple's proprietary 30-pin connector, used with portable electronics.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION OF THE INVENTION

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

As discussed earlier, the invention may apply to a variety of different electronic devices, which may use a variety of different connector technologies. Accordingly, this invention may be used with many electronic devices that mate with a variety of electrical connectors in order to receive and provide power and data. Examples of electronic devices that may include the present invention are shown in the following figure.

Figure 1A:
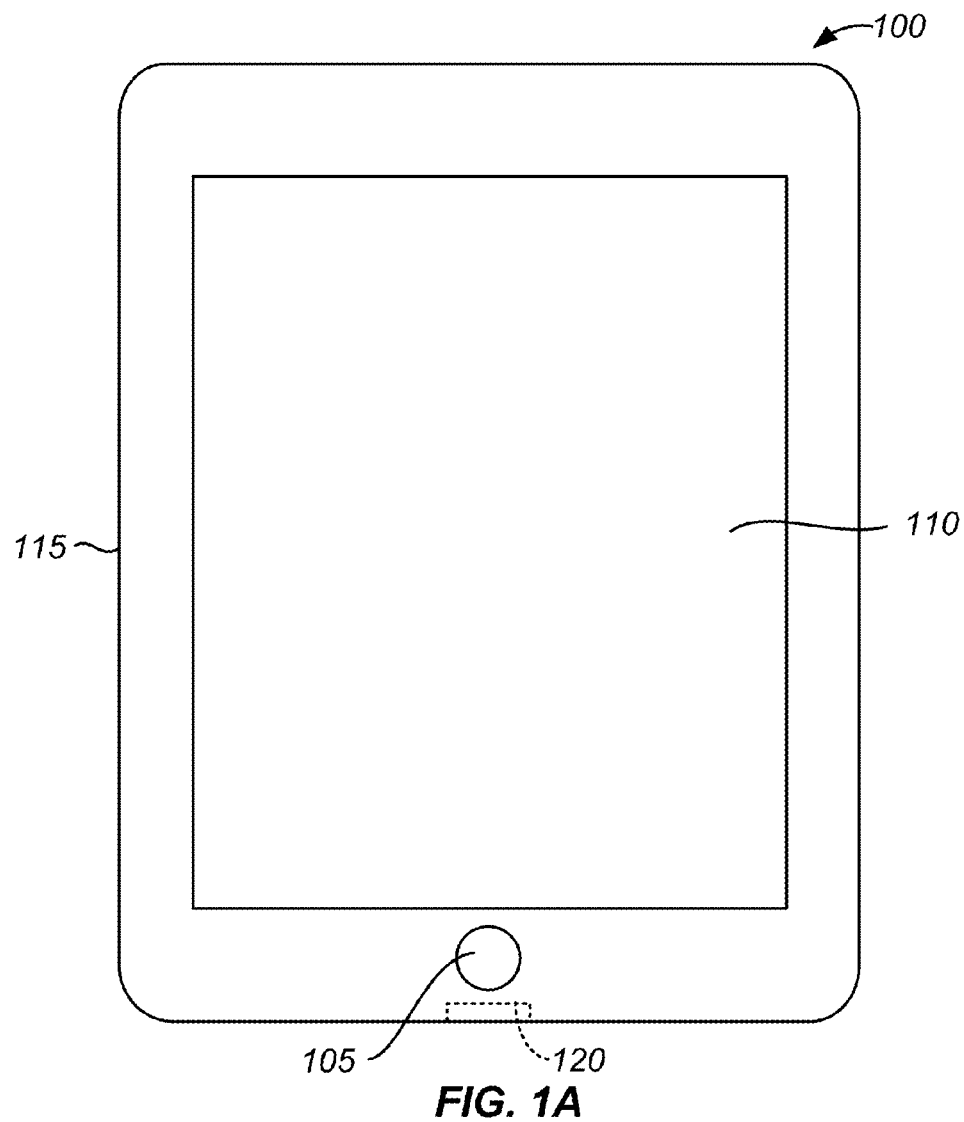
FIG. 1A depicts an illustrative rendering of one particular electronic media device that may include the present invention.

FIG. 1A depicts an illustrative rendering of one particular electronic media device 100 that may include the present invention. Device 100 includes a multipurpose button 105 as an input component and a touch screen display 110 as a both an input and output component, all of which are housed within a device housing 115. Device 100 also includes a primary receptacle connector 120 within device housing 115. Receptacle connector 120 can be positioned within housing 115 such that the cavity of the receptacle connectors into which a corresponding plug connector is inserted communicates with an opening (opening 130 shown in FIGS. 1B and 1C) at an exterior surface (bottom exterior surface 115a shown in FIGS. 1B and 1C) of the device housing 115.

For simplicity, various internal components, such as the control circuitry, graphics circuitry, bus, memory, storage device and other components are not shown in FIG. 1A. Embodiments of the invention disclosed herein are particularly suitable for use with plug connectors that are configured to mate with receptacle connector 120, but in some embodiments can also be used with audio plug receptacle (not shown in FIG. 1A).

Although device 10 is described as one particular electronic media device, embodiments of the invention are suitable for use with a multiplicity of electronic devices that include a receptacle connector for receiving a corresponding plug connector. For example, any device that receives or transmits audio, video or data signals among may be used with the invention. In some instances, embodiments of the invention are particularly well suited for use with portable electronic media devices because of their potentially small form factor. As used herein, an electronic media device includes any device with at least one electronic component that may be used to present human-perceivable media. Such devices may include, for example, portable music players (e.g., MP3 devices and Apple's iPod devices), portable video players (e.g., portable DVD players), cellular telephones (e.g., smart telephones such as Apple's iPhone devices), video cameras, digital still cameras, projection systems (e.g., holographic projection systems), gaming systems, PDAs, desktop computers, as well as tablet (e.g., Apple's iPad devices), laptop or other mobile computers. Some of these devices may be configured to provide audio, video or other data or sensory output.

Figure 1B:
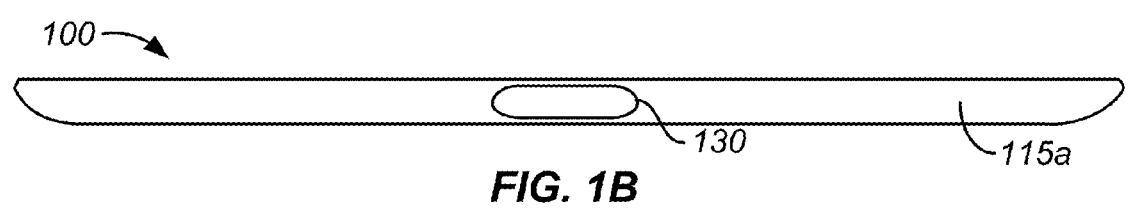
FIGS. 1B and 1C illustrate front views of an electronic media device not including and including a connector trim ring or bracket according to embodiments of the present invention, respectively.
Figure 1C:
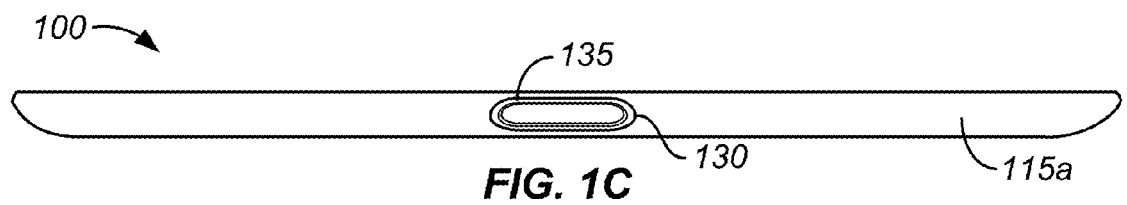

FIGS. 1B and 1C illustrate front views of electronic media device 100 not including and including a connector trim ring or bracket according to embodiments of the present invention, respectively. As shown in FIG. 1B, housing 115 of device 100 may include a bottom exterior surface 115a including an opening 130. As discussed above, a plug connector may be inserted through an opening 130 at an exterior surface of the device housing, e.g., bottom exterior surface 115a, in order to mate with receptacle connector 120. As shown in FIG. 1C, a bracket according to the present invention, e.g., bracket 135, may be sized to receive a plug connector and coupled with opening 130. A detailed discussion of brackets according to the present invention will be provided below.

Although receptacle connector 120 and opening 130 are shown in FIGS. 1A-1C as being disposed at bottom exterior surface 115a of device 100, brackets according to the present invention may be coupled with openings disposed at any number of surfaces of electronic device, e.g., a top, left, right or other exterior surface.

In order to better appreciate the features and aspects of trim rings or brackets of the present invention, further context for the invention is provided in the following section by discussing a one particular plug connector which may be inserted through brackets according to the present invention in order to mate with corresponding receptacle connectors housed within electronic devices.

Figure 2A:
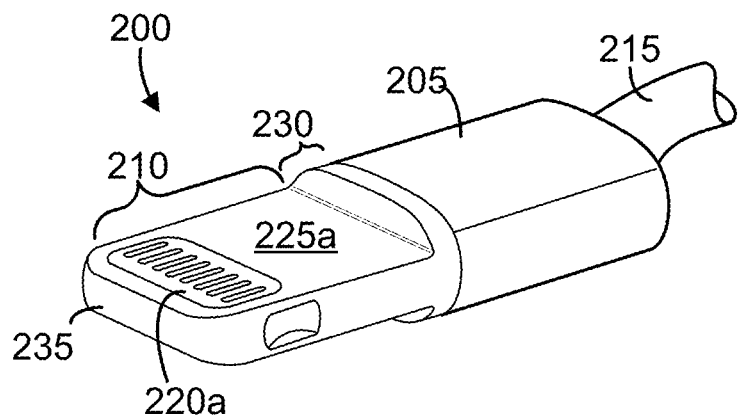
FIGS. 2A-2C depict an eight contact in-line dual orientation plug connector that may be received by trim rings or brackets according to embodiments of the present invention.
Figure 2B:
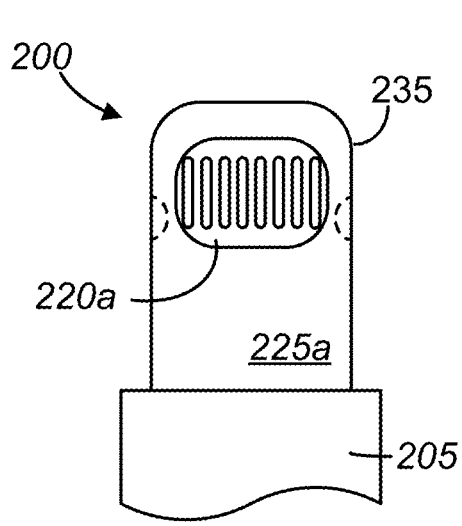
Figure 2C:
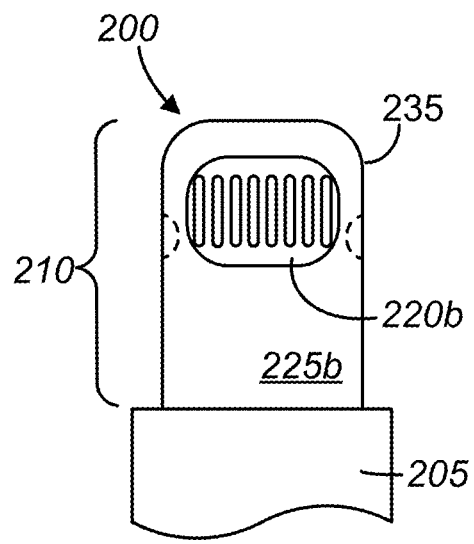

FIGS. 2A-2C depict an eight contact in-line dual orientation plug connector 200 that may be received by trim rings or brackets according to embodiments of the present invention. FIG. 2A is a simplified perspective view of plug connector 200 and FIGS. 2B and 2C are simplified top and bottom plan views, respectfully, of plug connector 200. As shown in FIG. 2A, plug connector 200 includes a body 205 and a tab or insertion end 210 that extends longitudinally away from a flanged end 230 in a direction parallel to the length of connector 200. A cable 215 can be attached to body 205 at an end opposite of insertion end 210.

Insertion end 210 may be inserted through brackets according to embodiments of the present invention, e.g., bracket 135 (shown in FIG. 1C), and into a corresponding receptacle connector, such as connector 120 (shown in FIG. 1A), during a mating event. Insertion end 210 includes a first contact region 220a formed on a first major surface 225a and a second contact region 220b formed at a second major surface 225b opposite surface 225a. Surfaces 225a, 225b extend from a distal tip or end of the insertion end 210 to flanged end 230. When insertion end 210 is inserted into a corresponding receptacle connector, surfaces 225a, 225b abut a housing of the receptacle connector and/or a bracket coupled to the electronic device housing in which the receptacle connector is incorporated. In some embodiments, insertion end 210 is between 4 and 7 mm wide, between 1 and 2 mm thick and has an insertion depth (the distance from the distal tip of insertion end 210 to flanged end 230) between 5 and 10 mm. The structure and shape of insertion end 210 and flanged end 230 may be defined by a ground ring or frame 235 that can be made from stainless steel or another conductive material.

In one embodiment, plug connector 200 can be the plug connector portion of a plug connector/receptacle connector pair that can be the primary physical connector system for an ecosystem of products that includes both host electronic devices and accessory devices. Examples of host devices include smart phones, portable media players, tablet computers, laptop computers, desktop computers and other computing devices. An accessory can be any piece of hardware that connects to and communicates with or otherwise expands the functionality of the host. Many different types of accessory devices can be specifically designed or adapted to communicate with the host device through plug connector 200 to provide additional functionality for the host. Plug connector 200 can be incorporated into each accessory device that is part of the ecosystem to enable the host and accessory to communicate with each other over a physical/electrical channel when plug connector 200 from the accessory is mated with a corresponding receptacle connector in the host device. Examples of accessory devices include docking stations, charge/sync cables and devices, cable adapters, clock radios, game controllers, audio equipment, memory card readers, headsets, video equipment and adapters, keyboards, medical sensors such as heart rate monitors and blood pressure monitors, point of sale (POS) terminals, as well as numerous other hardware devices that can connect to and exchange data with the host device.

As discussed above, although bracket 135 is described herein in relation to one particular plug connector (plug connector 200), embodiments of the invention are suitable for use with a multiplicity of plug connectors that correspond to receptacle connectors for electronic devices, e.g., other plug connectors described herein.

Brackets according to the present invention may include features to accommodate elements of plug connector 200 described above. In addition, embodiments of the present invention may include features to aid in coupling with receptacle connectors and electronic device housings in which the receptacle connectors are housed. Additional features of the invention may prevent damage to electronic devices and receptacle connectors housed therein. Examples of these features are shown in the following figures.

Figure 3A:
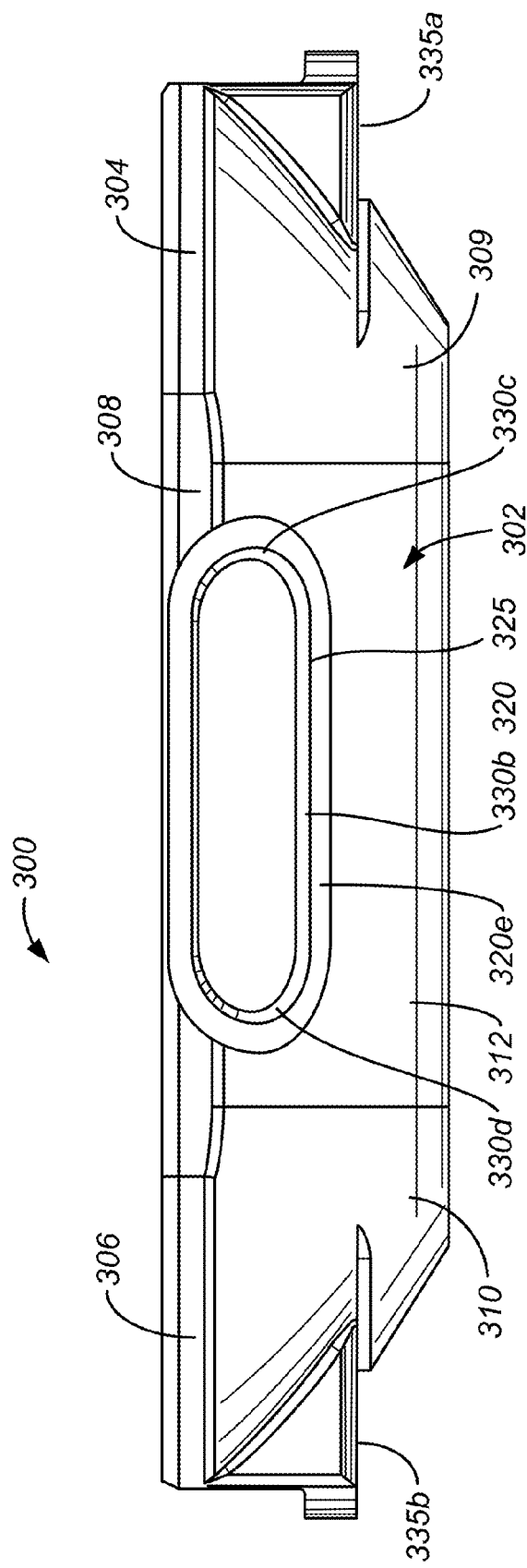
FIGS. 3A-3G illustrate a connector trim ring or bracket according to an embodiment of the present invention.
Figure 3B:
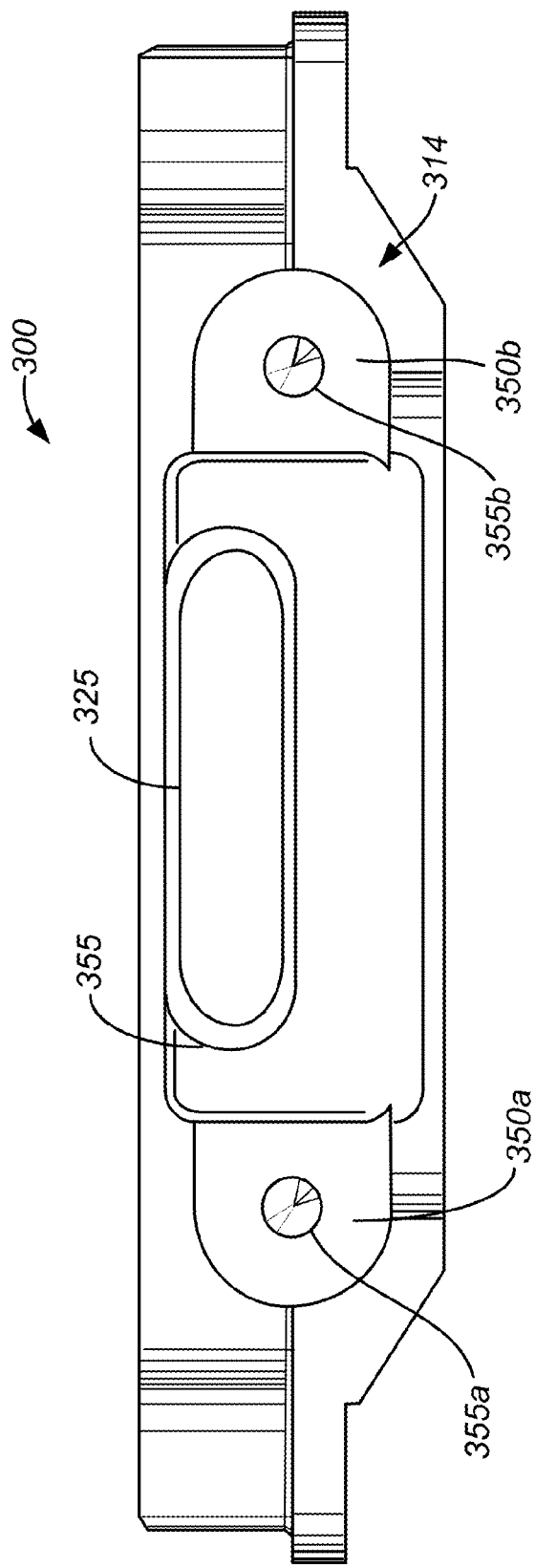
Figure 3C:
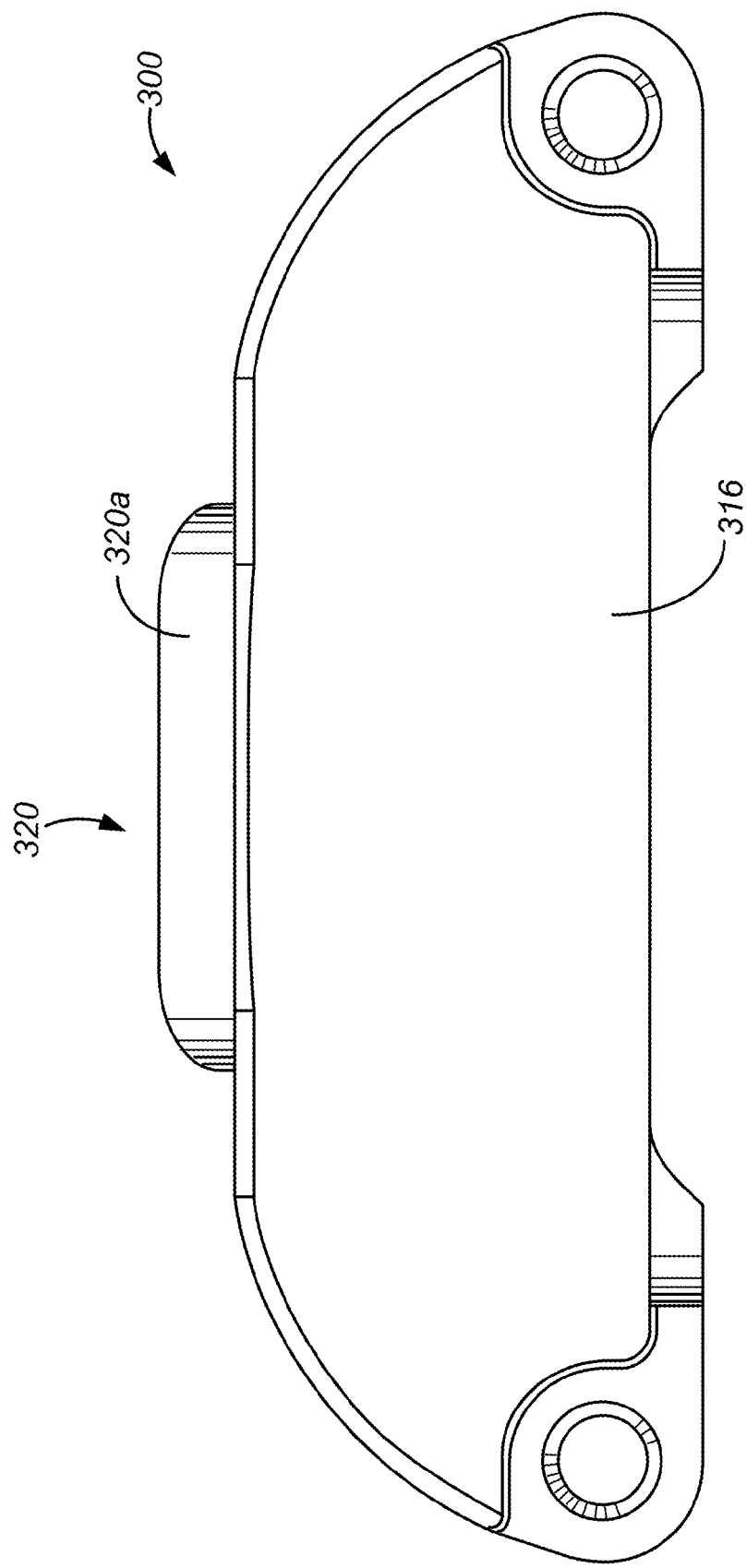
Figure 3D:
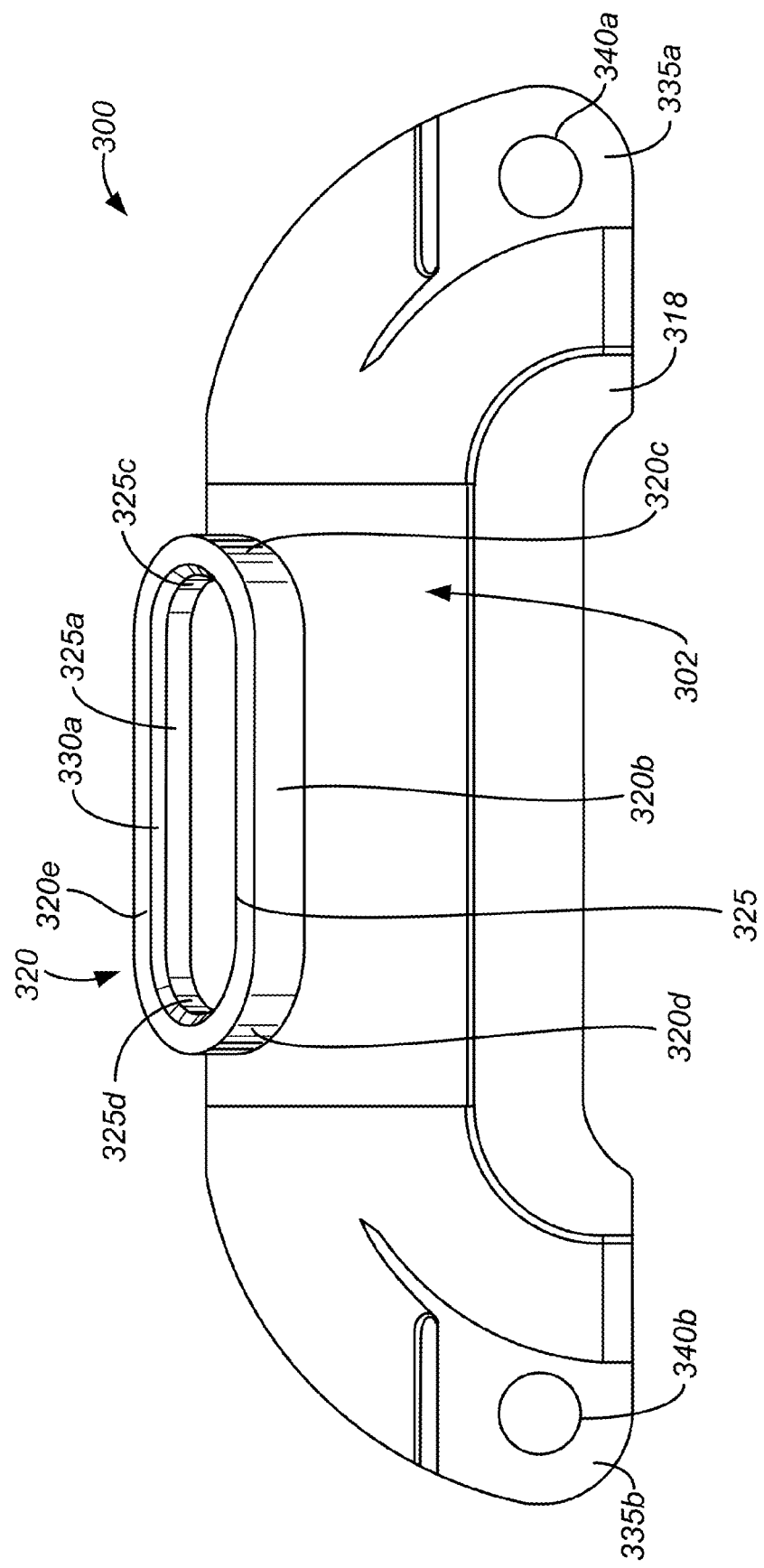
Figure 3E:
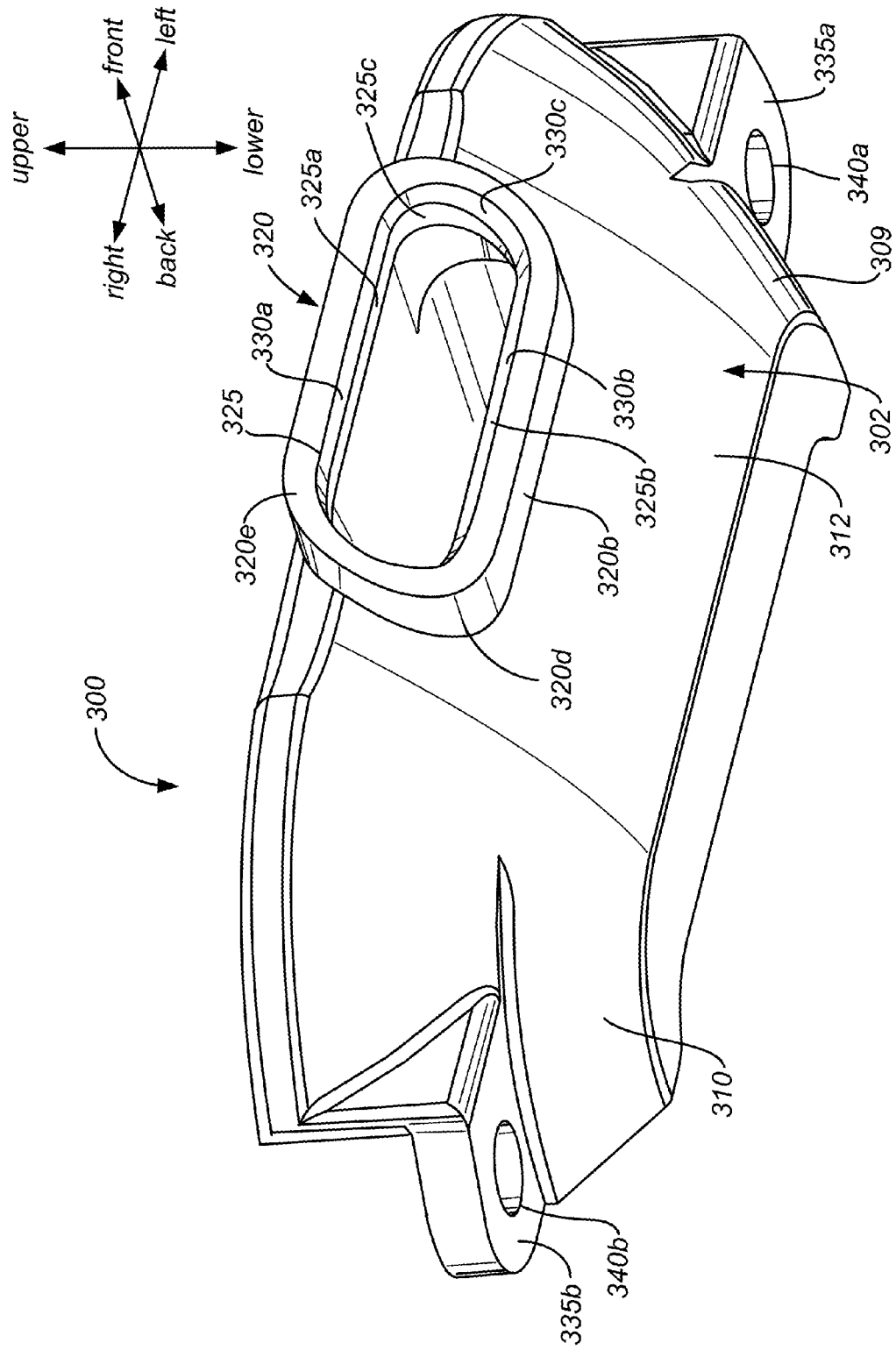
Figure 5A:
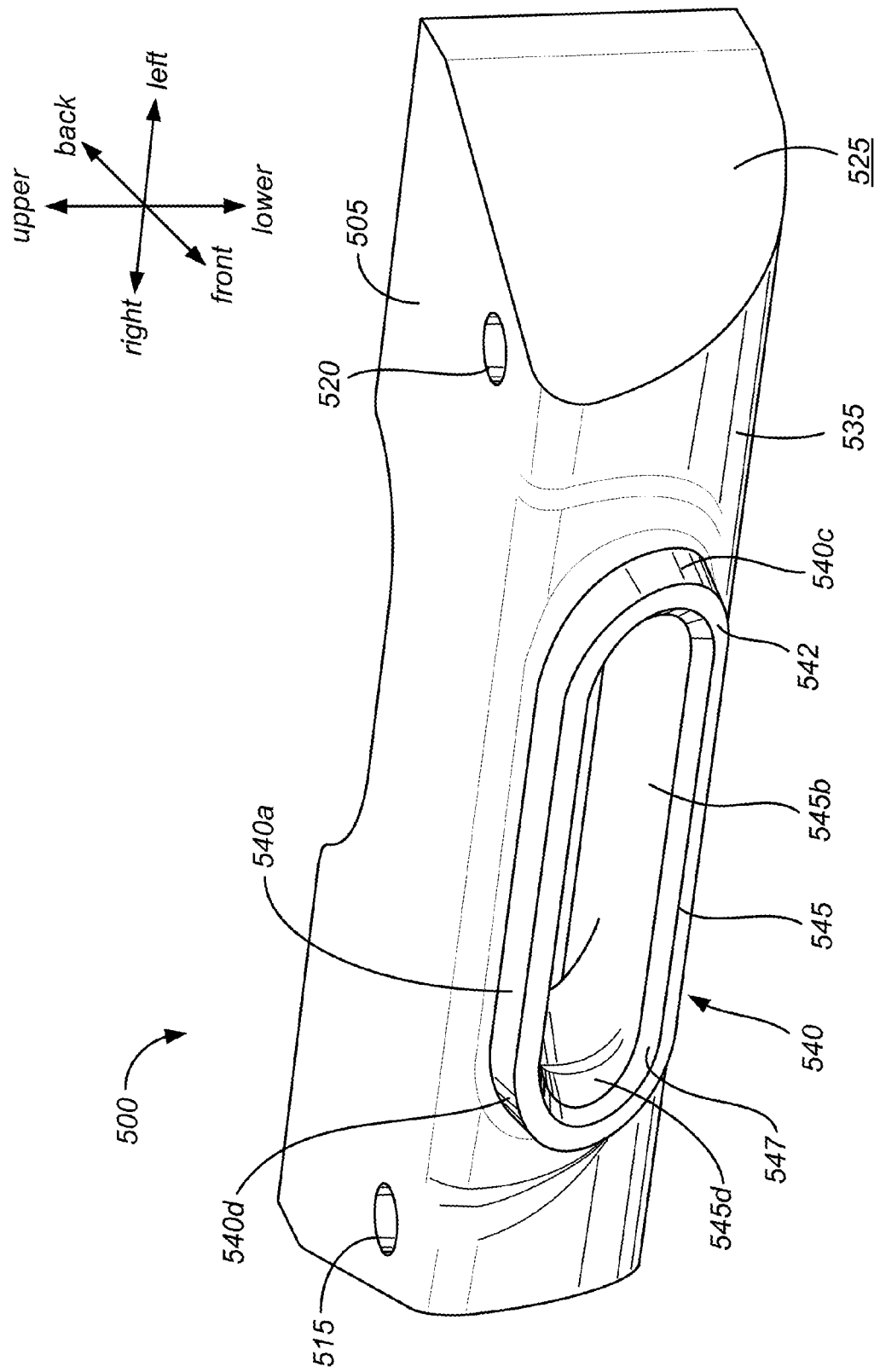
FIGS. 5A-5C are front, back and bottom perspective views, respectively, of a connector trim ring or bracket according to an embodiment of the present invention.

For purposes of description of the embodiment of the invention shown in FIGS. 3A-3G and FIGS. 5A-5C, a three-dimensional set of orthogonal axes is shown relative to a bracket 300 of FIG. 3E and a bracket 500 of FIG. 5A. The axes set (as shown in FIGS. 3E and 5A) are labeled relative to the direction in which bracket 300 extends through the device housing (e.g., housing 115 as shown in FIGS. 1A-1C) in as the front direction, and the opposite direction as the back direction to form a front-back axis. Orthogonal to the front direction, a right direction and left direction are shown and form a left-right axis. Again, orthogonal to the front-back and left-right axes, an upper direction and lower direction are shown which form an upper-lower axis. A frontal plane is defined by the left-right and upper-lower axes. A sagittal plane is defined by the front-back and upper-lower axes. A superior plane is defined by the left-right and front-back axes. Accordingly, it is apparent that the particular brackets 300 and 500 described below are symmetrical in a sagittal plane through a centerline through the center of the elongated opening (which opening is described below) in the sagittal plane, though asymmetrical in a frontal plane or a superior plane through that center. Brackets according to various embodiments of the invention may be symmetrical or asymmetrical in various planes as desired.

Figure 3F:
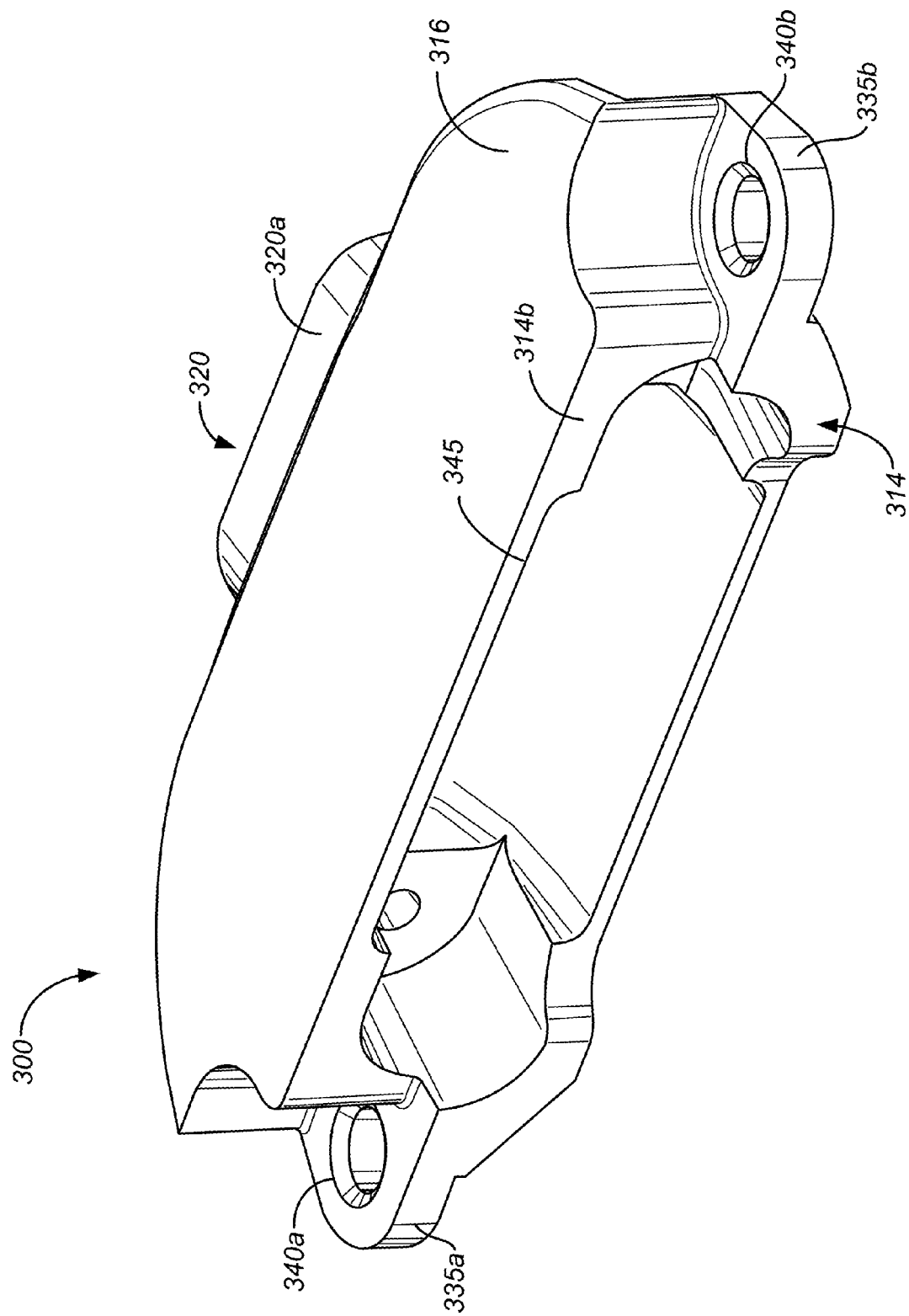
Figure 3G:
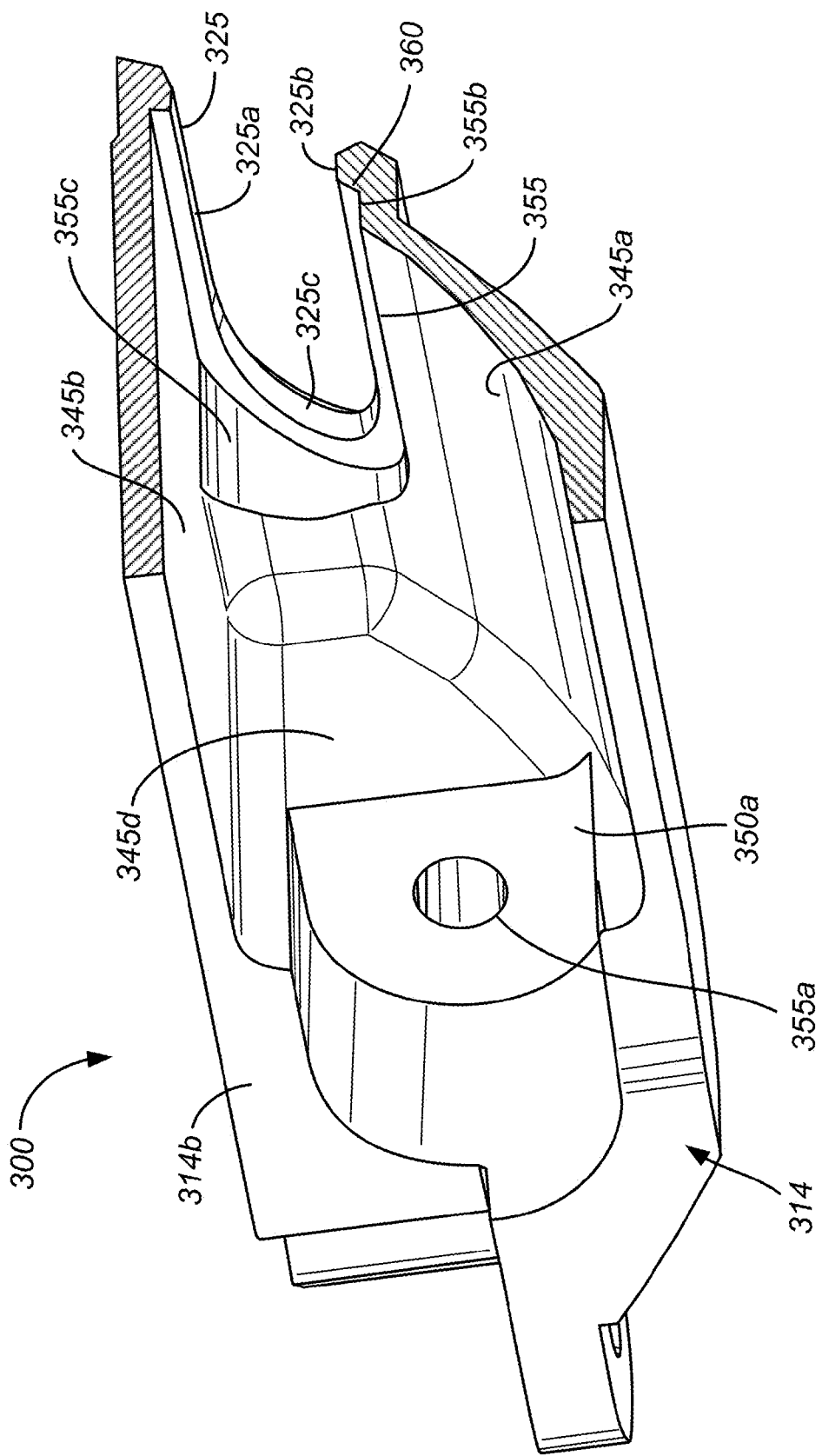

FIGS. 3A-3G illustrate a connector trim ring or bracket 300 according to an embodiment of the present invention. FIGS. 3A-3D are front, back, top and bottom plan views, respectively, of bracket 300 according to an embodiment of the present invention. FIGS. 3E-3F are front and back perspective views, respectively, of bracket 300 according to an embodiment of the present invention. FIG. 3G is a partial cutaway back perspective view of bracket 300 according to an embodiment of the present invention. Bracket 300 as shown in FIG. 3A includes a front face 302 having lower and upper front face portions. The upper portion include left and right portions 304, 306 and a center portion 308 extending between the left and right portions 304, 306. The lower portion includes left and right portions 309, 310 extending between a center portion 312. As shown in FIG. 3A, and more clearly in FIGS. 3C and 3E, left and right upper and lower portions 304, 306, 309, 310 may have a rounded curvature. FIGS. 3B-3D show that bracket 300 also includes a back face 314 and upper and lower opposing faces 316, 318.

As shown in FIGS. 3C and 3D, hollow protrusion 320 may extend from front face 302 and include upper and lower outer surfaces 320a, 320b, which surfaces may be planar, and left and right arcuate outer surfaces 320c, 320d. Hollow protrusion 320 may also include a front face 320e extending between surfaces 320a-320d. Hollow protrusion 320 may extend varying distances from front face 320e depending on a number of factors, including the geometry of an electronic device housing to which bracket 300 may be coupled. For example, hollow protrusion 320 may extend from the interior of the device housing (e.g., housing 115 as shown in FIG. 1A) and through an opening (e.g., opening 130 as shown in FIG. 1B) in the housing such that front face 320e is flush with an exterior surface (e.g., surface 115a as shown in FIGS. 1B and 1C) of the device housing.

As shown in FIGS. 3D and 3E, bracket 300 may include a first elongated opening 325 extending through hollow protrusion 320 and the rest of bracket 300. First elongated opening 325 may include upper and lower inner surfaces 325a, 325b, which surfaces may be planar, and left and right arcuate inner surfaces 325c, 325d. These inner surfaces of first elongated opening 325 may extend parallel to corresponding outer surfaces of hollow protrusion 320. First elongated opening 325 may be sized and configured to receive a plug connector corresponding to the device. Bevel surfaces may extend around an inner perimeter of first elongated opening 325 extending between corresponding inner surfaces 325a-325d and front face 320e. For example, upper, lower, left arcuate and right arcuate bevel surfaces 330a-330d may extended between front face 320e and upper, lower, left arcuate and right arcuate outer surfaces 320a-320d, respectively. These bevel surfaces may allow corresponding plug connectors (e.g., plug connector 460 shown in FIGS. 4B-4C) to be more readily insertable through bracket 300 and into corresponding receptacle connectors (e.g., receptacle connector 410 shown in FIGS. 4A-4C).

Although first elongated opening 325 is shown in FIGS. 3A-3F as having a particular shape, other embodiments of the invention may include openings for receiving plug connectors where the openings are otherwise shaped. For example, the first elongated opening 325 may be circular, triangular, rectangular or otherwise shaped. The shape of the hollow protrusion 320 may be similarly varied to be similar to or different from embodiments of first elongated opening 325.

As shown in FIGS. 3E and 3F, bracket 300 may include protrusions 335a, 335b that may extend from left and right portions 309, 310 of the front face 302. Fastener openings 340a, 340b may be disposed on protrusions 335a, 335b, oriented in planes that are parallel with upper face 316, and beveled. In some embodiments, protrusions 335a, 335b may be L-shaped so as to provide surfaces for positioning fastener openings that are oriented in planes that are perpendicular with upper face 316. Alternatively, one or more protrusions having fastener openings disposed thereon may extend from other faces of bracket 300, e.g., upper face 316 and/or lower face 318. Fasteners (not shown) may extend through fastener openings 340a, 340b in order to secure bracket 300 to a housing of an electronic device (housing 405 shown in FIG. 4A).

As shown in FIG. 3F, back face 314 of bracket 300 may include an irregularly shaped opening 345. Again, FIG. 3G is a partial cutaway view and it illustrates inner surfaces that may define the cavity of irregularly shaped opening 345. For example, a lower inner surface 345a is shown as having a curvature that extends parallel to the lower center portion 312 of front face 302. An upper inner surface 345b is also shown and may be oriented in a plane that is parallel to upper face 316 (as shown in FIG. 3F). A left inner surface 345d may extend between upper and lower inner surfaces 345a. Although only a left half of bracket 300 is shown in FIG. 3G, a right half of bracket 300 may be symmetrical in the plane about which bracket 300 is cut in FIG. 3G, e.g., irregular opening 345 may include a right inner surface corresponding to left inner surface 345d.

As shown in FIG. 3G, the cavity of irregularly shaped opening 345 may also be defined by left and right alignment surfaces 350a, 350b (shown in FIG. 3B), which surfaces may include left and right alignment openings 355a, 355b (shown in FIG. 3B), respectively. Surfaces 350a, 350b may be planar and left and right alignment openings 355a, 355b may be oriented in a plane that is perpendicular to upper face 316. These openings 355a, 355b may be used to align with corresponding features on a receptacle connector (e.g., receptacle connector 410 shown in FIGS. 4A-4C) coupled with bracket 300.

As further shown in FIG. 3G, back face 314 also includes a second elongated opening 355 that may correspond to, i.e., be centered about the same point as, the first elongated opening 325. Second elongated opening 355 may be larger than first elongated opening 325 and include lower and left arcuate inner surfaces 355b, 355c. Although not shown, second elongated opening 355 may also include a right arcuate inner surface corresponding to left arcuate inner surface 355c. As shown in FIG. 3G, upper inner surface 345b of irregularly shaped opening 345 may serve as the upper inner surface of second elongated opening 355. A beveled surface 360 may extend between inner surfaces 325b-325d and corresponding inner surfaces of second elongated opening 355b, 355c, and a right arcuate inner (not shown in FIG. 3G). However, a bevel surface may not extend between upper inner surface 345b and upper inner surface 325a. Right and left (355c) inner arcuate surfaces of second elongated opening 355 may be concentric with right left inner surfaces 325c, 325d and/or left and right arcuate outer surfaces 320c, 320d.

Bracket 300 may be made from materials such as stainless steel (e.g., 301 or 17-4 stainless steel) or other high modulus, high strength materials. Bracket 300 may be manufactured according to a number of different methods, including pressed powder sintering, investment casting, computer numerical control (CNC) machining, forging, metal injection molding (MIM) or other.

Although bracket 300 is shown in FIGS. 3A-3G as having a particular geometry, the geometry of the bracket of the present invention may vary to accommodate the geometry of corresponding electronic device housings and receptacle connectors with which brackets of the invention may be mated. Examples of how brackets of the invention interface with corresponding device housings and receptacle connectors are shown in the following figures.

Figure 4A:
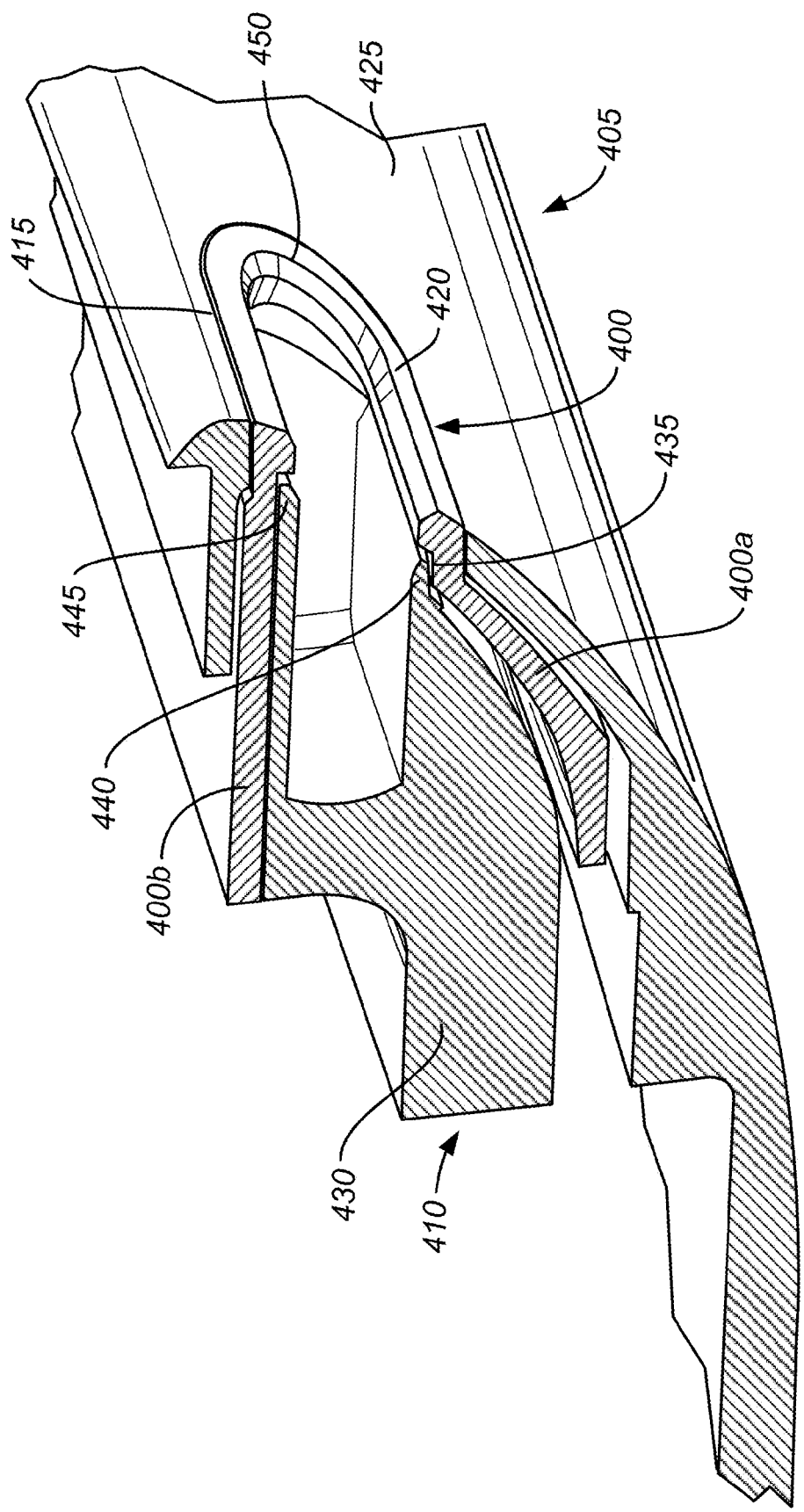
FIG. 4A illustrates a cutaway perspective view of a bracket of the invention coupled with an electronic device housing and a receptacle connector.

FIG. 4A illustrates a cutaway perspective view of a bracket 400 of the invention coupled with an electronic device housing 405 and a receptacle connector 410. Bracket 400 may extend through an opening 415 of housing 405 such that a front face 420 may be flush with exterior surface 425 of housing 405. Bracket 400 may also extend into the interior of housing 405 so as to surround a portion of a housing 430 of receptacle connector 410. As shown in FIG. 4A, portions 400a, 400b of bracket 400 may be shaped so as to conform and be flush with corresponding surfaces of receptacle connector 410 and housing 405. In addition, an opening 435 (e.g., second elongated opening 325) that include inner surfaces (e.g., upper, lower and left, right arcuate inner surfaces) that serve as a ledge on which lips 440, 445 of receptacle connector 410 may interface.

Bracket 400 may also include an opening 450 for receiving a plug connector corresponding to receptacle connector 410. An example of how a plug connector interfaces with bracket 400 when inserted into opening 415 is shown in the following figures.

Figure 4B:
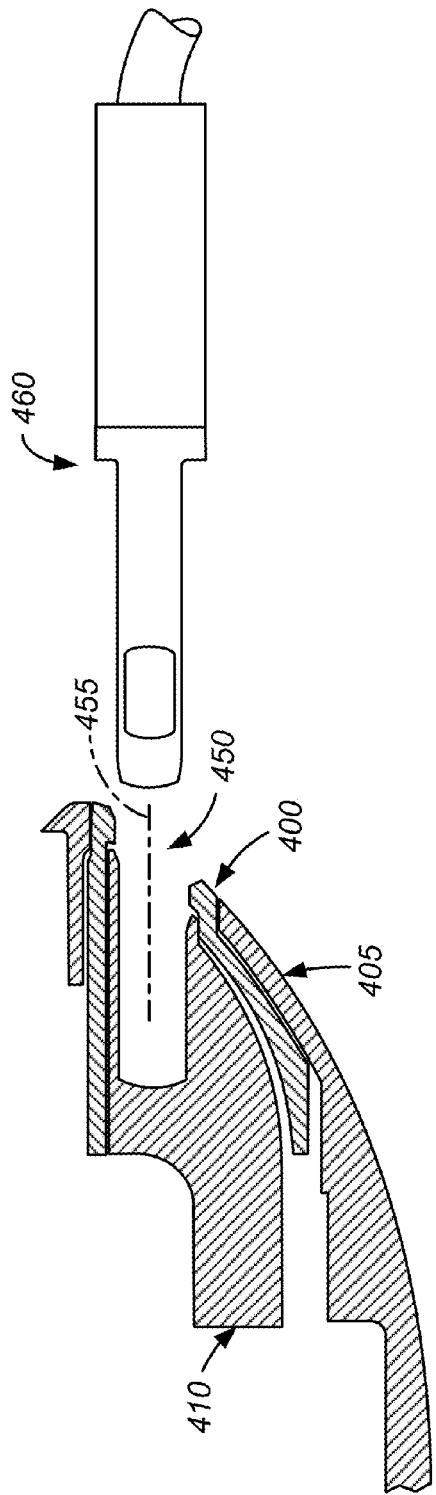
FIGS. 4B and 4C illustrate a plug connector proximate to and inserted through the bracket of FIG. 4A of the invention, respectively.
Figure 4C:
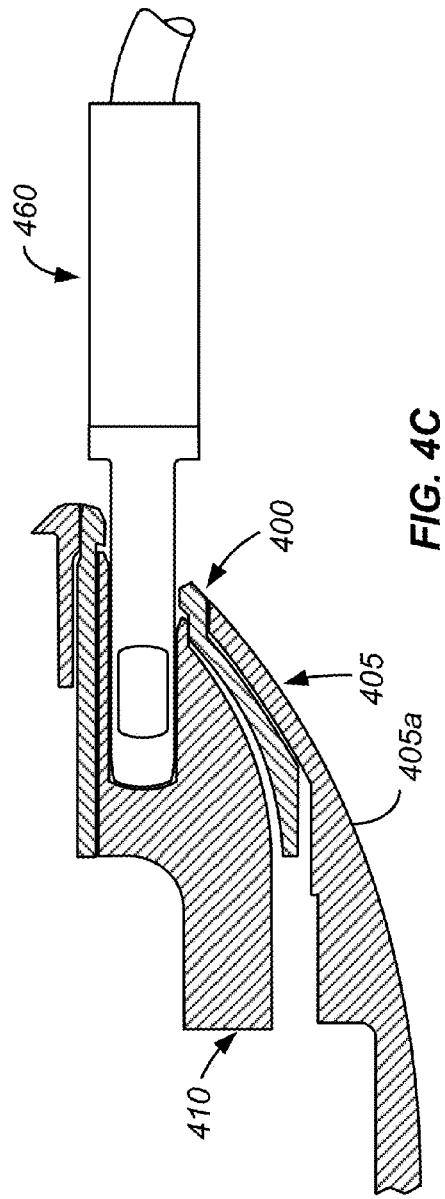

FIGS. 4B and 4C illustrate a plug connector 460 proximate to and inserted through bracket 400 of the invention, respectively. FIG. 4B shows a typical insertion path 455 which plug connector 460 may follow in being inserted through bracket 400 and into receptacle connector 410. Insertion path 455 shows that plug connector 460 does not necessarily contact housing 405 during an insertion event. Instead, bracket 400 may shield housing 405 from contact with a plug connector 460. Thus, wear on housing 405 may be reduced when a bracket, e.g., bracket 400, is coupled to housing 405. This could be particularly beneficial where housing 405 is made from aluminum or other metals that can be prone to wear, especially where plug connector 460 is made from hard metallic materials such as stainless steel.

When plug connector 460 is inserted into receptacle connector 410, as shown in FIG. 4B, loads and torques may be applied to plug connector 460. When these loads are applied, bracket 400 may prevent damage to receptacle connector 410 as it surrounds a portion of receptacle connector 410 so as to reinforce receptacle connector 410 by absorbing some of those loads. In the absence of bracket 400, torques applied by plug connector 460 while inserted into receptacle connector 410 may cause localized forces around opening 415 of housing 405. However, bracket 400 prevents localized forces from being applied to opening 415 by spreading out torques and loads to the rest of the housing via fastening mechanisms (e.g., fasteners and fastener openings 340a, 340b discussed above) that may secure bracket 400 to housing 405. By reinforcing and spreading loads, bracket 400 may prevent damage to housing 405 and receptacle connector 410.

As discussed above, brackets 300 and 400 may be sized and shaped to accommodate a particular device housing and corresponding receptacle connector. For example, brackets 300 and 400 may be particularly suited for devices having housing surfaces defined by spline curvature such as spline curvature 405a (shown in FIG. 4C). Some device may have housing surfaces that are defined by a more or less dramatic spline curvature. In order to illustrate generally how brackets of the invention may be varied depending on a corresponding device housing, the following figures show an example of a bracket for a device having a housing surface defined by a less dramatic spline curvature.

Figure 5B:
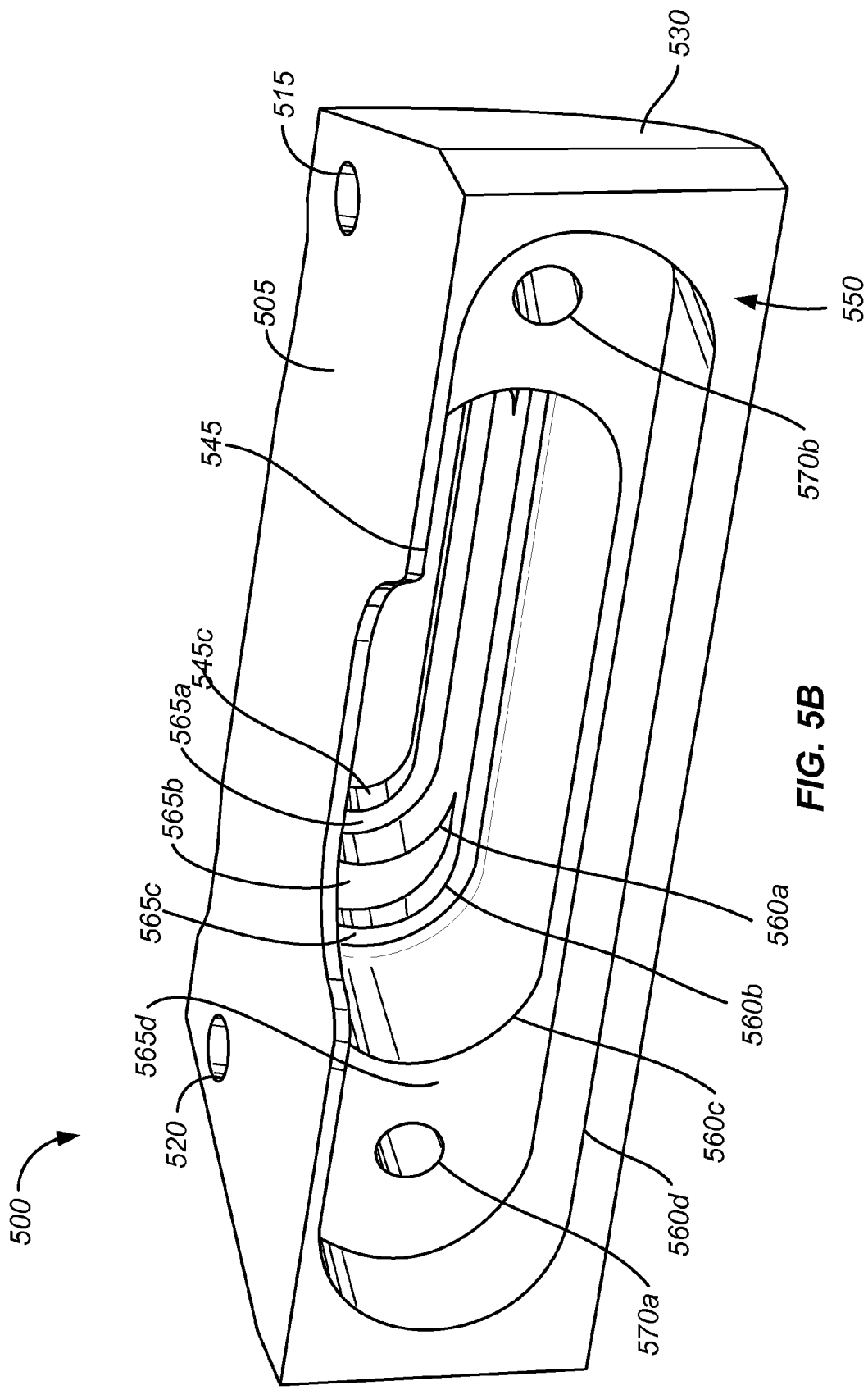
Figure 5C:
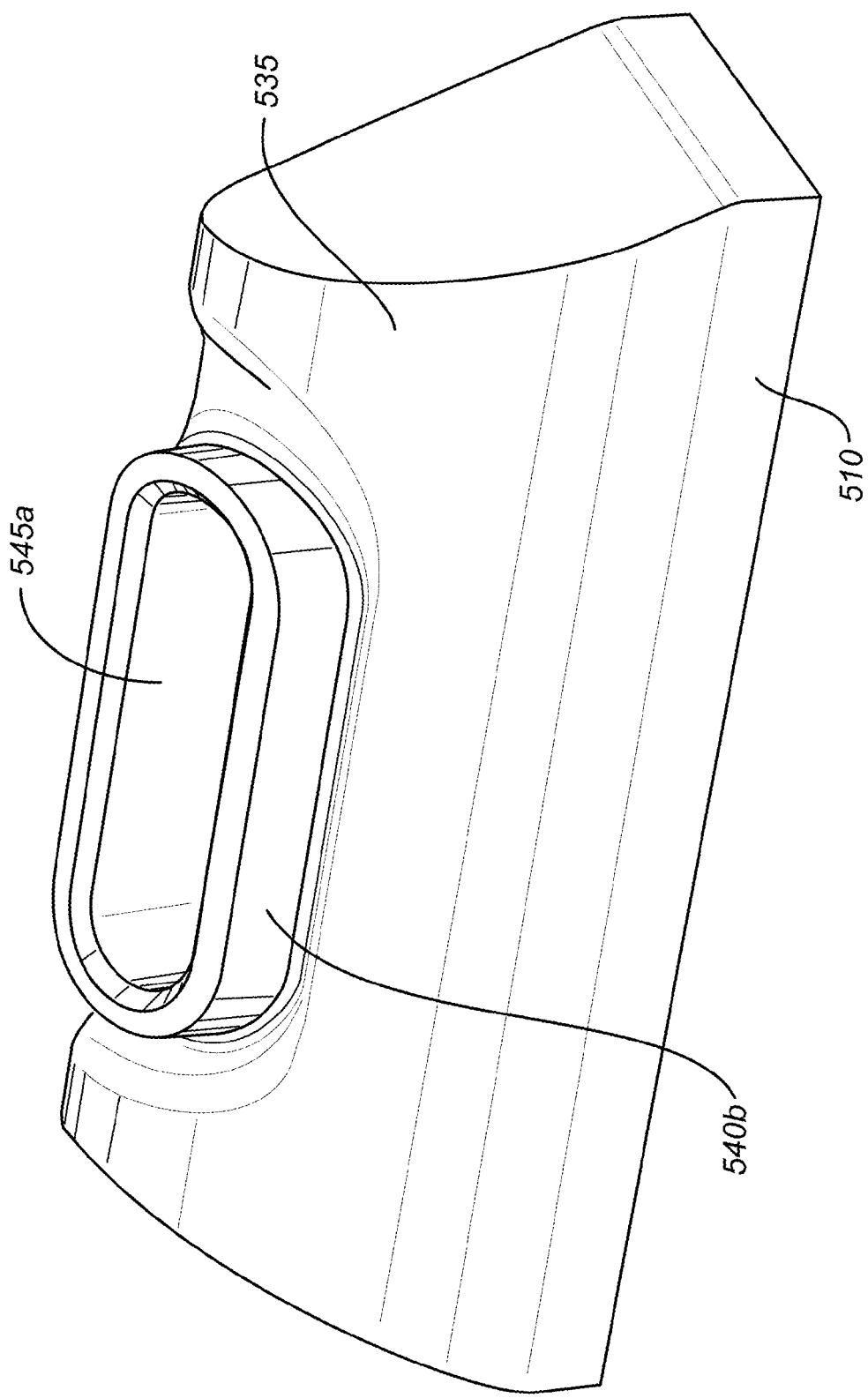

FIGS. 5A-5C are front, back and bottom perspective views, respectively, of a connector trim ring or bracket 500 according to an embodiment of the present invention. As shown in FIGS. 5A and 5C, bracket 500 includes upper and lower opposing faces 505 and 510. Upper face 505 includes first and second fastener openings 515, 520 disposed at right and left portions of upper face 505, respectively. Bracket 500 may also include rounded left and right opposing faces 525, 530 (show in FIG. 5B) and a front face 535. A hollow protrusion 540 may extend from front face 535. Hollow protrusion 540 may include an upper and lower outer surfaces 540a, 540b, which surfaces may be planar, and left and right arcuate outer surfaces 540c, 540d that may extend between surfaces 540a, 540b. Hollow protrusion 540 may also include a front face 542 extending between surfaces 540a-540d. A first elongated opening 545 may extending through hollow protrusion 540 and through the remainder of bracket 500 from front face 535 to a back face 550 (shown in FIG. 5B), which surface may be planar.

First elongated opening 545 may include upper and lower opposing inner surfaces 545a, 545b, which surfaces may be planar, and left and right arcuate inner surfaces 545c (shown in FIG. 5B), 545d that may extend between surfaces 545a, 545b. Upper and lower inner surfaces 545a, 545b may extend parallel to upper and lower outer surfaces 540a, 540b and left and right arcuate inner surfaces 545c, 545d may extend in a direction concentric with left and right arcuate outer surfaces 540c, 540d. First elongated opening 545 may also include a bevel surface 547 extending between front face 542 and inner surfaces 545a-545d.

As shown in FIG. 5B, back face 550 may include a number of elongated openings, including second, third, fourth, and fifth openings 560a-560d. Second, third, fourth and fifth elongated openings 560a-560d may communicate with first, second, third, and fourth elongated openings 540, 560a, 560b, 560c, respectively. Second elongated opening 560a may be larger than first elongated opening 540 in the right to left direction and the upper to lower direction, thereby forming a first ledge 565a. Third elongated opening 560b may be larger than second elongated opening 560a in the right to left direction, thereby forming a second ledge 565b. Fourth elongated opening 560c may be larger than third elongated opening 560b in the right to left direction and the upper to lower direction, thereby forming a third ledge 565c. Fifth elongated opening 560d may be larger than fourth elongated opening 560c in the right to left direction and the upper to lower direction, thereby forming a fourth ledge 565d. Ledges 565a-565d may each be oriented in a plane that is parallel to the back bracket face 550. Ledges 560a-560d may serve as supports for features of receptacle connector coupled with bracket 500 as discussed below.

In addition, ledge 565d may include left and right portions including first and second alignment openings 570a, 570b, respectively. These openings 570a, 570b may be used to align a receptacle connector (e.g., receptacle connector 610 shown in FIGS. 6A-6C) with bracket 500 using corresponding features on a receptacle connector.

Although bracket 500 is shown in FIGS. 5A-5C as having a particular geometry, the geometry of brackets of the present invention may vary to accommodate the geometry of corresponding electronic device housings and receptacle connectors with which brackets of the invention may be mated. Examples of how brackets of the invention interface with corresponding device housings and receptacle connectors are shown in the following figures.

Figure 6A:
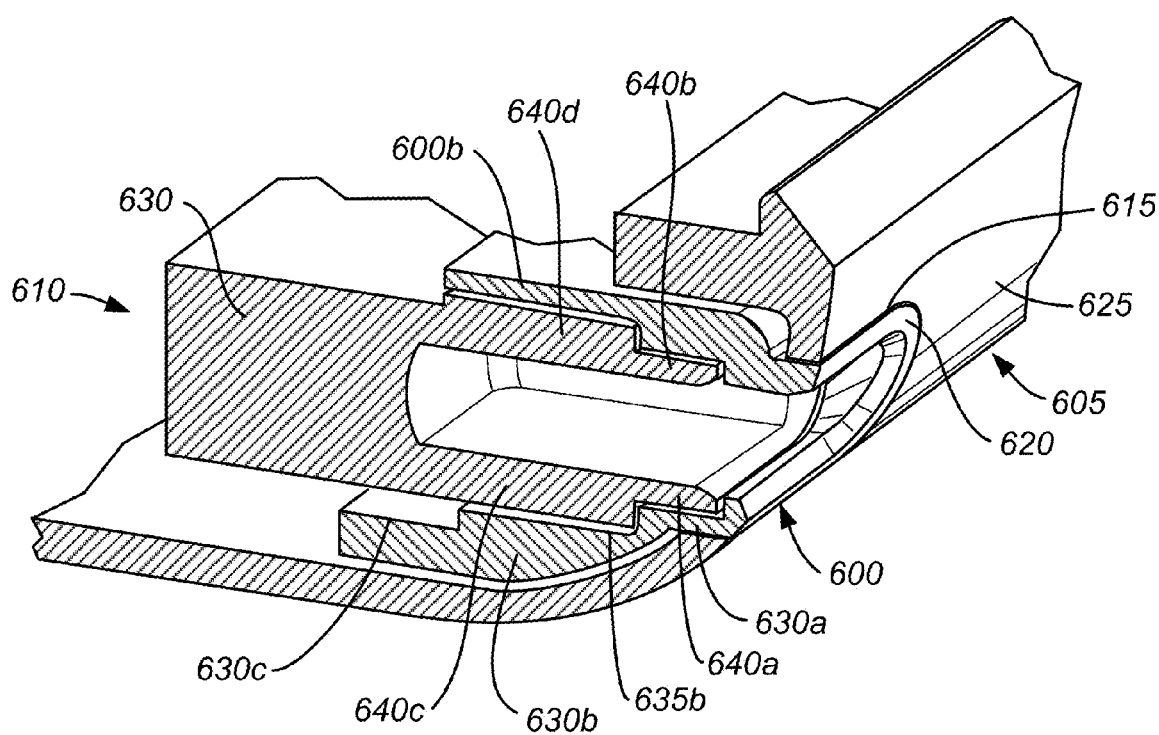
FIG. 6A illustrates a cutaway perspective view of a bracket of the invention coupled with an electronic device housing and a receptacle connector.

FIG. 6A illustrates a cutaway perspective view of a bracket 600 of the invention coupled with an electronic device housing 605 and a receptacle connector 610. Bracket 600 may extend through an opening 615 of housing 605 such that a front face 620 of bracket 600 may be flush with an exterior surface 625 of housing 605. Bracket 600 may also extend into the interior of housing 605 so as to surround a portion of a housing 630 of receptacle connector 610. As shown in FIG. 6A, portions 600a, 600b of bracket 600 may be shaped to conform and be flush with corresponding surfaces of receptacle connector 610 and housing 605. In addition, ledges 630a-630c may be disposed adjacent to corresponding lips 640a, 640b or other geometry 640c, 640d of receptacle connector 610 when receptacle connector 610 is mated with bracket 600.

FIG. 6A further illustrates, when compared to FIG. 4A, how the thicknesses of various elements of brackets of the invention may be varied depending on the geometry of a device enclosure and/or a receptacle connector.

An example of how a plug connector interfaces with bracket 600 when inserted into receptacle connector 610 is shown in the following figures.

Figure 6B:
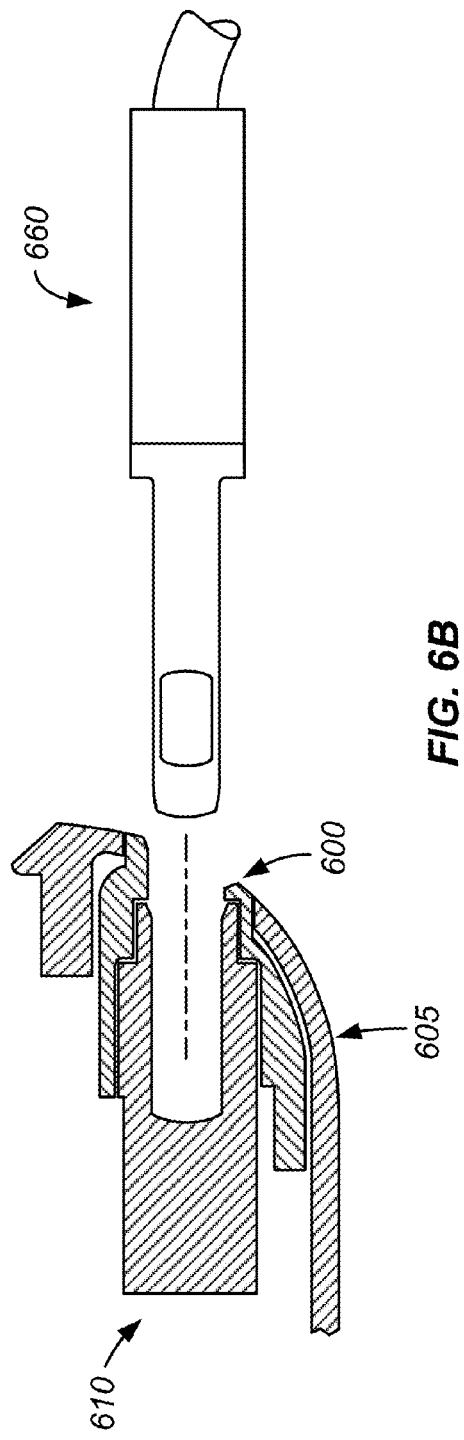
FIGS. 6B and 6C illustrate a plug connector proximate to and inserted through the bracket of FIG. 6A of the invention, respectively.
Figure 6C:
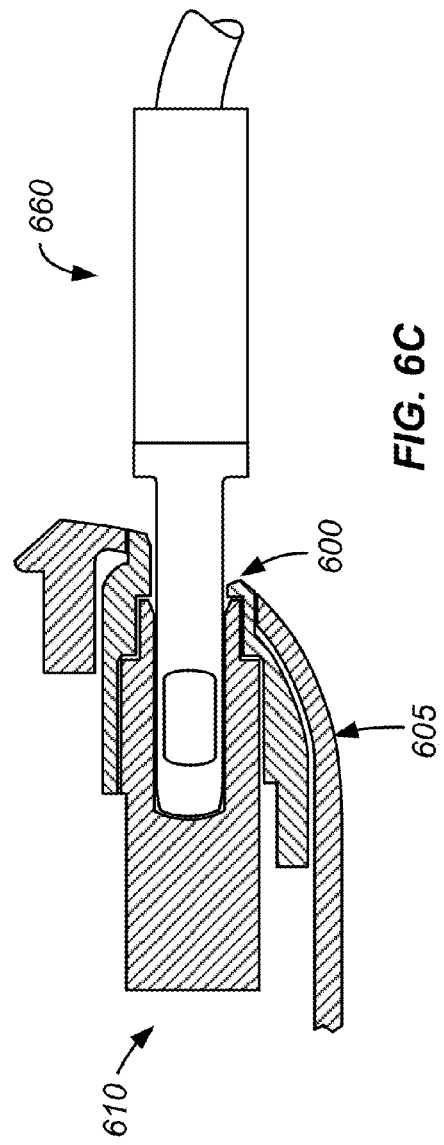

FIGS. 6B and 6C illustrate a plug connector 660 proximate to and inserted through bracket 600 of the invention, respectively. FIGS. 6B and 6C show that bracket 600 may provide similar wear reduction for housing 605, plug connector 660 applied load distribution, and reinforcement for housing 605 and receptacle connector 610 as discussed above with regards to FIGS. 4B and 4C.

In addition to the mechanical aspects of brackets according to the present invention described above, brackets of the invention may also provide a cosmetic two tone appearance marking the location for plug connector insertion when coupled with an electronic device housing. Thus, embodiments described herein may be varied for cosmetic reasons in addition to or instead of structural reasons.

Brackets according to the present invention may also be overmolded or coated with an electrically insulative material in order to prevent an electrostatic discharge through a device housing when a plug connector is mated therewith. This may be particularly useful for electronic devices that include a radio frequency (RF) antenna.

Also, while a number of specific embodiments were disclosed with specific features, a person of skill in the art will recognize instances where the features of one embodiment can be combined with the features of another embodiment. For example, some specific embodiments of the invention set forth above were illustrated as including a number of geometric features. A person of skill in the art will readily appreciate embodiments of the present invention may include all, some or a combination of the geometric features described in relation to any of the embodiments described herein and may include additional geometric features not described herein. Also, those skilled in the art will recognize, or be able to ascertain using no more than routine experimentation, many equivalents to the specific embodiments of the inventions described herein. Such equivalents are intended to be encompassed by the following claims.

What is claimed is:

1. A bracket comprising:
upper and lower faces;
a back face having a first opening that communicates with a cavity, the cavity defined at least in part by left and right alignment surfaces having left and right openings, respectively; and
a protrusion extending from the front face and having a second opening that communicates with the first opening and extends through the protrusion.

2. The bracket of claim 1, wherein the second opening includes:
upper and lower second opening inner surfaces; and
right and left arcuate second opening inner surfaces, the right and left arcuate second opening inner surfaces extending between the upper and lower second opening inner surfaces.

3. The bracket of claim 2, wherein the protrusion further includes:

upper and lower protrusion outer surfaces that extend from the front face;

right and left arcuate protrusion outer surfaces that extend from the bracket front face, the right and left arcuate protrusion outer surfaces extending between the upper and the lower protrusion outer surfaces; and a protrusion front face extending from the upper and lower outer protrusion surfaces and the right and left arcuate protrusion outer surfaces.

4. The bracket of claim 1, wherein the protrusion is a first protrusion, wherein the bracket further comprises second and third protrusions having first and second fastener openings, respectively, the second and third protrusions extending from the front face.

5. The bracket of claim 1, wherein the cavity is further defined by upper and lower opposing inner surfaces, the lower inner surface including a portion that extends parallel to a portion of the front face.

6. A bracket configured to be positioned between a receptacle connector and a housing of an electronic device, the bracket comprising:
   a back face;
   a front face comprising:
      an upper portion including a center upper portion and left and right upper portions, the left upper portion extending from the center upper portion toward a back direction and a left direction; the right upper portion extending from the center upper portion toward the back direction and a right direction; and
      a lower portion including a center lower portion and left and right lower portions, the center lower portion extending from the center upper portion toward the back direction and a lower direction, the right lower portion extending from the center lower portion toward the back and right directions, the left lower portion extending from the center lower portion toward the back and left directions; and
   a protrusion extending from the front face and having an opening.

7. The bracket of claim 6, wherein the protrusion further includes:
   upper and lower protrusion outer surfaces that extend from the front face;
   right and left arcuate protrusion outer surfaces that extend from the front face, the right and left arcuate protrusion outer surfaces extending between the upper and the lower protrusion outer surfaces; and
   a protrusion front face extending from the upper and lower outer protrusion surfaces and the right and left arcuate protrusion outer surfaces.

8. The bracket of claim 7, wherein the opening includes:
   an upper opening bevel surface extending between the protrusion front face and the upper opening inner surface;
   a lower opening bevel surface extending between the protrusion front face and the lower opening inner surface;
   a left arcuate opening bevel surface extending between the protrusion front face and the left arcuate opening inner surface; and
   a right arcuate opening bevel surface extending between the protrusion front face and the right arcuate opening inner surface.

9. The bracket of claim 6, wherein the bracket further comprises first and second fastener openings oriented in planes that are parallel to the bracket upper face and disposed on first and second protrusions that extend from the left and right lower portions of the front face, respectively.

10. The bracket of claim 6, wherein the lower portion of the front face is configured to be flush with a surface of the housing of the electronic device when the bracket is positioned between the receptacle connector and the housing.

11. The bracket of claim 6, wherein the opening is a first opening, and wherein the protrusion is configured and sized to be received by a second opening of the housing of the electronic device.

12. The bracket of claim 6, wherein the opening is configured and sized to receive a plug connector corresponding to the receptacle connector; wherein the opening is a first opening; and wherein the back face includes a second opening configured and sized to receive a portion of the receptacle connector.

13. A bracket configured to be positioned between a receptacle connector and a housing of an electronic device, the bracket comprising:
   upper and lower faces;
   right and left faces;
   a front face having a protrusion extending therefrom, the protrusion having a first opening; and
   a back face having a second opening that communicates with the first opening, the second opening larger than the first opening thereby forming a first ledge extending between the first and second openings,
   wherein the back face further includes a third opening in communication with the second opening, the third opening larger than the second opening thereby forming a second ledge extending between the second and third openings.

14. The bracket of claim 13, wherein first and second fastener openings are disposed on the upper face.

15. The bracket of claim 13, wherein the protrusion further includes:
   upper and lower protrusion outer surfaces that extend from the front face;
   right and left arcuate protrusion outer surfaces that extend from the front face, the right and left arcuate protrusion outer surfaces extending between the upper and the lower protrusion outer surfaces; and
   a protrusion front face extending from the upper and lower outer protrusion surfaces and the right and left arcuate protrusion outer surfaces.

16. The bracket of claim 13, wherein the front face is configured to be flush with a surface of the housing of the electronic device when the bracket is positioned between the receptacle connector and the housing.

17. The bracket of claim 13, wherein the protrusion is configured and sized to be received by an opening at an exterior surface of the housing of the electronic device.

18. The bracket of claim 13, wherein the first opening is configured and sized to receive a plug connector corresponding to the receptacle connector.

* * * * *

UNITED STATES PATENT AND TRADEMARK OFFICE
CERTIFICATE OF CORRECTION

PATENT NO. : 9,099,856 B2  
APPLICATION NO. : 14/318345  
DATED : August 4, 2015  
INVENTOR(S) : Erik A. Uttermann, John Raff and Piotr S. Trzaskos Page 1 of 1

It is certified that error appears in the above-identified patent and that said Letters Patent is hereby corrected as shown below:

In the claims

Column 12, Line 56, Claim 1: please delete "the front" and insert --a front--.

Signed and Sealed this
Twelfth Day of January, 2016

Michelle K. Lee
*Director of the United States Patent and Trademark Office*